United States Patent [19]

Lailach et al.

[11] Patent Number: 4,952,387
[45] Date of Patent: Aug. 28, 1990

[54] PROCESS FOR SEPARATING METAL SULPHATES FROM SULPHURIC ACID

[75] Inventors: Günter Lailach; Rudolf Gerken; Wolfgang Rens, all of Krefeld, Fed. Rep. of Germany

[73] Assignee: Bayer Aktiengesellschaft, Leverkusen, Fed. Rep. of Germany

[21] Appl. No.: 218,734

[22] Filed: Jul. 13, 1988

[30] Foreign Application Priority Data

Aug. 6, 1987 [DE] Fed. Rep. of Germany ....... 3726047

[51] Int. Cl.$^5$ ............... C01B 17/90; C01G 23/053; C01G 49/14
[52] U.S. Cl. ...................... 423/531; 423/83; 423/140; 423/DIG. 2; 423/558
[58] Field of Search ............ 423/522, 531, DIG. 2, 423/140, 83

[56] References Cited

U.S. PATENT DOCUMENTS

| | | | |
|---|---|---|---|
| 1,146,071 | 7/1915 | Hoffman | 423/531 |
| 1,384,974 | 7/1921 | Shaw | 423/531 |
| 1,795,995 | 3/1931 | Busching | 423/531 |
| 2,196,584 | 4/1940 | Edison | 423/DIG. 2 |
| 3,210,156 | 10/1965 | Zirngibl | 423/DIG. 2 |
| 3,387,927 | 6/1968 | Goldberger | 423/531 |
| 3,436,177 | 4/1969 | Spedden et al. | 423/531 |
| 3,542,508 | 11/1970 | Sercombe et al. | 423/DIG. 2 |
| 3,816,593 | 6/1974 | Johnson et al. | 423/140 |
| 4,155,984 | 5/1979 | Cohen et al. | 423/531 |

FOREIGN PATENT DOCUMENTS

| | | |
|---|---|---|
| 0133505 | 2/1985 | European Pat. Off. |
| 1173074 | 1/1961 | Fed. Rep. of Germany |
| 1145598 | 3/1963 | Fed. Rep. of Germany ... 423/DIG. 2 |
| 2029117 | 12/1970 | Fed. Rep. of Germany ...... 423/531 |
| 3329842 | 2/1985 | Fed. Rep. of Germany |
| 54-41297 | 4/1979 | Japan ................................. 423/531 |
| 59-78910 | 5/1984 | Japan ................................. 423/531 |
| 59-120290 | 7/1984 | Japan ................................. 423/531 |
| 508302 | 6/1939 | United Kingdom ................ 423/531 |

Primary Examiner—Gary P. Straub
Attorney, Agent, or Firm—Sprung Horn Kramer & Woods

[57] ABSTRACT

A process for the separation of metal sulphates from dilute sulphuric acid by evaporative concentration of the sulphuric acid to a concentration of from 55 to 75% by weight $H_2SO_4$, cooling of the resulting solution or suspension and mechanically separating the solid metal sulphates and/or hydrogen sulphates, wherein an Fe-(III) content of at least 0.01% by weight is ensured before the separation.

6 Claims, No Drawings

PROCESS FOR SEPARATING METAL SULPHATES FROM SULPHURIC ACID

BACKGROUND OF THE INVENTION

Field of the Invention

This invention relates to a process for the separation of metal sulphates from dilute sulpuric acid by evaporating the sulphuric acid to a concentration of from 55 to 75% by weight $H_2SO_4$, cooling the resulting solution or suspension and mechanically separating the solid metal sulphates and/or hydrogen sulphates.

BACKGROUND INFORMATION

Sulphuric acid containing metal sulphates is obtained as waste product of many different processes, e.g., the mordanting of metal or the production of titanium dioxide by the sulphate process. It is important, mainly for ecological reasons, to separate the free sulphuric acid from the metal sulphates so that it can be returned to the production process. In the present state of the art, this is carried out by evaporation of the sulphuric acid solutions in the liquid phase to increase their concentration, which is in most cases from 15 to 30% by weight, to about 65% $H_2SO_4$ (DE-B1 173 074=U.S. Pat. No. 3,210,156), EP-A 133 505). Slow cooling of the suspension is conventionally carried out before the metal sulphates are mechanically separated from the sulphuric acid. According to DE-A 3 329 842, a very low Fe(III) content in the solution, which may be obtained by the addition of reducing agents, improves the separation of Cr(III) ions from the sulphuric acid.

It was found problematic in the separation of solid metal sulphates from sulphuric acid that sulphates and hydrogen sulphates of Mg and especially of Al crystallize to a very fine state of subdivision and tend to oversaturate in the sulphuric acid solution. A high Al ion content in the sulphate-containing sulphuric acid, the so-called "waste acid", which is formed in the production of titanium dioxide from titanium slag, gives rise to particularly serious problems when attempts are made to separate the sulphates from the approximately 65% sulphuric acid, which is obtained by the evaporative concentration of the waste acid The solid metal sulphates present in the suspension which is obtained by evaporative concentration and cooling sediment only very slowly. They are difficult to filter and the filter cake still has a large amount of sulphuric acid adhering to it, which reduces the economic efficiency of the recovery process.

SUMMARY OF THE INVENTION

It is thus an object of the present invention to provide a process which does not have the disadvantages of the processes described above.

It has now surprisingly been found that the rate of sedimentation can be increased and filtration can therefore be improved by adding Fe(III) ions to the metal sulphate-containing sulphuric acid.

The present invention therefore relates to a process for the separation of metal sulphates from dilute sulphuric acid by evaporating the sulphuric acid to a concentration of from 55 to 75% by weight $H_2SO_4$, cooling the resulting solution or suspension and mechanically separating the solid metal sulphates and/or hydrogen sulphates, characterised in that an Fe(III) content of at least 0.01% by weight is present before separation.

It has been found that even very small quantities of Fe(III) produce a distinct advantage. In a preferred embodiment of the process according to the invention, the Fe(III) content is from 0.01 to 1% by weight.

According to the invention, the Fe(III) ions are added in the form of Fe(III) salts or salt solutions and/or produced by oxidation of Fe(II) ions in the sulphuric acid solution and/or produced by reaction of the sulphuric acid in the solution with compounds containing Fe(III), such as $Fe_2O_3$, $Fe_3O_4$, $FeOOH$ or $Fe(OH)_3$. The addition and/or production of Fe(III) ions according to the invention may be carried out before, during or after evaporative concentration of the metal sulphate-containing sulphuric acid.

One particularly preferred embodiment of the process according to the invention consists in that the Fe(III) content is adjusted by the addition of Fe(III) compounds which are soluble in sulphuric acid, preferably oxides or hydroxides, to the sulphuric acid-containing system.

The measures according to the invention, in particular, reduce the Al content of the separated sulphuric acid by the addition of Fe(III) according to the invention.

Particularly important for the recovery of separated sulphuric acid in the preparation of titanium dioxide pigment, however, is the effect that the chromium and vanadium content in the sulphuric acid is also considerably reduced by the addition according to the invention of Fe(III).

The advantages according to the invention will be made clear by comparing a comparison example according to the state of the art with an example according to the invention, but this is not to be regarded as implying a limitation.

COMPARISON EXAMPLE

Waste acid (for its composition see Table 1) was continuously concentrated by evaporation under a vacuum at a temperature of not more than 100° C. After the resulting suspension had been slowly cooled to 55° C. with stirring, the metal sulphates and hydrogen sulphates were separated by means of a vacuum drum filter. A moist filter cake 9 mm in thickness was formed.

TABLE 1

| Composition of the various products (% by weight) | | | |
|---|---|---|---|
| | Waste acid | Filter cake | Filtrate |
| $H_2SO_4$ | 26.1 | 17.2 | 65.5 |
| $SO_4^-$ total | 34.6 | 63.8 | 69.3 |
| $Fe^{2+}$ | 2.6 | 13.8 | 0.07 |
| $Fe^{3+}$ | <0.001 | 0.001 | 0.001 |
| $Al^{3+}$ | 0.21 | 0.5 | 0.35 |
| $Mg^{2+}$ | 0.51 | 2.0 | 0.41 |
| $Cr^{3+}$ | 0.029 | 0.1 | 0.03 |
| $V^{4+}$ | 0.058 | 0.3 | 0.004 |

EXAMPLE

Waste acid (composition as in Comparison Example) was concentrated by evporation under the same conditions as in the Comparison Example. After the evaporative concentration, 0.06% by weight of iron oxide ($\alpha$-$Fe_2O_3$) corresponding to 0.04% $Fe^{3+}$, based on the suspension, was added and the mixture was slowly cooled to 55° C. with stirring, as in the Comparison Example. Sedimentation of the salt in the cooled suspension proceeded considerably more rapidly than in the Comparison Example. On filtration, a crumbly filter cake 13 mm in thickness was obtained under the same conditions.

TABLE 2

| | Composition of the products (% by weight) | |
|---|---|---|
| | Filter cake | Filtrate |
| $H_2SO_4$ | 15.0 | 65.8 |
| $SO_4^-$ total | 62.4 | 69.0 |
| $Fe^{2+}$ | 14.1 | 0.07 |
| $Fe^{3+}$ | 0.3 | 0.001 |
| $Al^{3+}$ | 0.7 | 0.25 |
| $Mg^{2+}$ | 2.0 | 0.39 |
| $Cr^{3+}$ | 0.1 | 0.02 |
| $V^{4+}$ | 0.3 | 0.001 |

It will be appreciated that the instant specification and claims are set forth by way of illustration and not limitation, and that various modifications and changes may be made without departing from the spirit and scope of the present invention.

What is claimed is:

1. In a process for the separation of metal sulphates from dilute sulphuric acid comprising evaporatively concentrating the sulphuric acid to a concentration of from 55 to 75% by weight $H_2SO_4$, cooling the resulting solution or suspension and mechanically separating the resultant solid metal sulphates and/or hydrogen sulphates, the improvement comprising said dilute sulphuric acid prior to said concentrating having a Fe(III) content of less than 0.001% by weight and maintaining a Fe(III) content of at least 0.01% by weight before said mechanical separating and after said concentrating.

2. A process according to claim 1, wherein the maintained Fe(III) content is from 0.01 to 1% by weight.

3. A process according to claim 1, wherein the Fe(III) content is maintained by an addition of Fe(III) salts.

4. A process according to claim 1, wherein the Fe(III) content is maintained by oxidation of Fe(II) ions in the sulphuric acid solution or suspension.

5. A process according to claim 1, wherein the Fe(III) content is maintained by the addition to the sulphuric acid solution or suspension of Fe(III) compounds which are soluble in sulphuric acid.

6. A process according to claim 5, wherein the Fe(III) compounds are selected from the group consisting of $Fe_2O_3$, $Fe_3O_4$, $FeOOH$ and $Fe(OH)_3$.

* * * * *